United States Patent [19]
Haven et al.

[11] Patent Number: 5,374,968
[45] Date of Patent: Dec. 20, 1994

[54] OPTICS FOR A SINGLE-LENS VIDEO PROJECTOR WITH COLOR-SPECIFIC POLARIZATION CHANNELS

[75] Inventors: Duane A. Haven, Cupertino; David W. Vollmer, Santa Cruz; Douglas H. Harrison, Redwood City, all of Calif.

[73] Assignee: Greyhawk Systems, Inc., Mountain View, Calif.

[21] Appl. No.: 148,479

[22] Filed: Nov. 8, 1993

[51] Int. Cl.[5] .......................................... G03B 21/00
[52] U.S. Cl. .................................. 353/31; 353/34; 353/38; 353/20; 359/40; 348/757
[58] Field of Search ................... 353/31, 33, 34, 37, 353/98, 20; 348/756, 757, 779, 780, 781, 782; 359/40

[56] References Cited

U.S. PATENT DOCUMENTS

| | | |
|---|---|---|
| 4,019,807 | 4/1977 | Boswell et al. |
| 4,191,456 | 3/1980 | Hong ............................ 353/31 |
| 4,425,028 | 1/1984 | Gagnon et al. ............... 353/31 |
| 4,464,018 | 8/1984 | Gagnon . |
| 4,500,172 | 2/1985 | Gagnon ........................ 353/31 |
| 4,749,259 | 6/1988 | Ledebuhr ..................... 353/33 |
| 4,826,311 | 5/1989 | Ledebuhr ..................... 353/33 |
| 4,836,649 | 6/1989 | Ledebuhr et al. ............ 353/31 |
| 4,909,601 | 3/1990 | Yajima et al. ................ 353/31 |
| 5,098,183 | 3/1992 | Sovehara ...................... 353/31 |
| 5,221,982 | 6/1993 | Faril .............................. 353/31 |
| 5,245,449 | 9/1993 | Ooi et al. ..................... 353/31 |

FOREIGN PATENT DOCUMENTS

5053224  3/1993  Japan ................................... 353/20

OTHER PUBLICATIONS

Ledebuhr, Arno G.; "Full-Color Single-Projection-Lens Liquid Crystal Light-Valve Projector"; SID 1986 Digest; pp. 379-382.

*Primary Examiner*—William A. Cuchlinski, Jr.
*Assistant Examiner*—William C. Dowling
*Attorney, Agent, or Firm*—Flehr, Hohbach, Test, Albritton & Herbert

[57] ABSTRACT

A high-efficiency optical system for use in a liquid-crystal light-valve video projector. High intensity, unpolarized white light is separated into primary color components by color-selective filters transmitting light containing both first and second polarization states. Light of each primary color is characterized by a wavelength passband whereby the endpoints of the passband are defined by first and second wavelengths. The second passband endpoint of the first polarization state of the first primary color overlaps the first passband endpoint of the second polarization state of the second primary color, and the second passband endpoint of the second polarization state of the second primary color overlaps the first passband endpoint of the first polarization state of the third primary color. In addition, the video projector design utilizes low f/# optics in conjunction with absorptive polarizers to remove residual light of an unwanted polarization state allowed into the system by the low f/# optics. This allows high brightness with high efficiency and without sacrificing contrast.

11 Claims, 4 Drawing Sheets

OPTICS FOR A SINGLE-LENS VIDEO PROJECTOR WITH COLOR-SPECIFIC POLARIZATION CHANNELS

CROSS-REFERENCE TO RELATED APPLICATION

Reference is made to the application entitled, THREE COLOR CHANNEL, TWO-ELEVATION OPTICS FOR A SINGLE LENS VIDEO PROJECTOR, Ser. No. 08/148,933, filed on the same date as the instant invention, having one common inventor and a common assignee.

BACKGROUND OF THE INVENTION

Field of the Invention

The present invention relates generally to improved brightness and contrast in image projection systems. Specifically, the invention relates to brightness and contrast improvements in liquid crystal light valve based video projection systems.

The demand for large screen video is growing rapidly as VCR, Laserdisc and computer driven programming are used increasingly by organizations of all sizes for all types of applications. Large screens, as opposed to monitors, are needed when the application calls for more than a few persons to look at the same video screen. All large screens (over 35 inches) are either rear or forward projector units. The vast majority of all projectors sold are based on a design that uses 3 high-power CRT's (one for each primary color) to both form the image and to provide the actual projection light. This is accomplished by merely focusing each of the 3 CRT's onto the viewing screen with 3 separate projection lenses.

The basic problem with CRT based video projectors is brightness. A CRT's brightness is proportional to the size of the CRT's screen and to the power supplied to the CRT. Thus brightness can be increased by either increasing the size of the CRT or by increasing the power supplied to it. But as more power is provided, heat becomes a serious problem and image resolution suffers. In addition, as screen sizes increase, the optics become prohibitively expensive. Currently 9 inch diagonal CRT's can deliver approximately 300 lumens to the screen. When projectors having this level of brightness are used on a 60 inch screen, the ambient light in the screening room must be very dim for the picture to be seen. And if a larger screen is used, the room must be proportionally darker. But, in a large number of applications such as training seminars, it is an advantage to have a bright screening room.

The most promising approach to solving the brightness problem comes from a new projector technology, light valves. This technology holds great promise, but is not now commercially practical (except for a few very expensive units sold in small quantities). The present invention is intended to solve some of the problems that have prevented the light valve projector from becoming a widely available commercial success.

In general, light valve based video projectors work as follows. White light from a high-intensity source, such as a Xenon lamp, is separated into component primary color beams and polarized. Each polarized primary color light beam is relayed through a series of lenses and mirrors to a valve which then modulates the polarization phase of the light as it is reflected from the light valve. The high-intensity light pattern in each color channel is analyzed by polarizer-analyzer optics and then projected onto a viewing screen. Low power CRT's are used to address the liquid crystal light valves.

Projector light output determines as a practical matter both screen size and how bright the screening room may be since a good picture is partly a function of the difference between the brightness of the on screen image and the level of light in the room. But image quality is also strongly affected by the difference between the brightest and darkest parts of an on screen image regardless of the level of light in the room. This difference is called contrast ratio. The higher the contrast ratio, generally speaking, the more pleasing the projected image.

One of the salient problems standing in the way of the commercialization of light valve projectors is as follows. It is particularly difficult, yet necessary, to achieve a high contrast ratio and high brightness and at the same time have an efficient optical system. The only suppliers of commercial light valve based projectors have approached this problem by sacrificing efficiency. These suppliers make projectors that have a huge projection light source. But the optics of the system are such that only a small portion of the available light is used. This design yields a projector with high contrast. It also yields a projector with brightness that in spite of the inefficiency is much greater than that of CRT based projectors. The problems with this approach are at least twofold. First, the projectors are large, heavy and expensive. Second, they require at least 220 volt power which inherently means a custom, fixed installation. However, most users need the flexibility to wheel the projector from room to room and plug into widely available 110 volt office power supplies.

These problems with light valve projectors have been obvious for years and many have attempted to solve or at least improve on the situation.

This problem was addressed in U.S. Pat. Nos. 4,191,456 by Hong, and 4,464,018 by Gagnon. Their approach was the addition of a reflective pre-polarizing prism of the MacNeille type to the polarization optics of the high-intensity projection light. Light of one polarization state is transmitted into the optics train while light of the second polarization state is discarded from the system. This approach improves the contrast ratio because the introduction of the prepolarizing prisms improves the polarizing efficiency of the system. The problem with this approach is that the system throughput efficiency is limited by the initial rejection of 50% of the input light. Thus brightness and efficiency were sacrificed.

To enhance contrast and improve throughput efficiency in a two-color projection system, Gagnon, U.S. Pat. No. 4,500,172 describes the use of a prepolarizing prism to transmit light of a first polarization state to a selective color filter which reflects light of the first polarization state and first color to a beam combiner and hence to a second polarizing prism to be transmitted to a first liquid-crystal light valve. Light of the second polarization state is reflected from the prepolarizing prism to a selective color filter where light of a second color is reflected to the beam combiner and hence transmitted to the polarizing prism to be reflected to a second liquid crystal light valve. In this way, the light in both polarization states is preserved. However, this design requires that the polarizing prisms maintain polarization efficiency over the passbands of both the first and second colors. To accomplish this requires additional processing time and expense to deposit the additional polarizing layers. In addition, this design is limited to two colors.

To extend the two color design of U.S. Pat. No. 4,500,172 to full color, Gagnon, U.S. Pat. No. 4,425,028, described a fluid-coupled optical tank with color selective pre-polarization. This is a complicated optical design. It calls for plate prepolarizing beam splitters which require as many as 15 thin film layer pairs. In addition, the optical system is immersed in a high refractive index fluid. This system selectively rejects light of a first color passband and first polarization state while transmitting light of first color and first polarization state as well as light of second and third colors with first and second polarization states. The advantage of this design is that it allows high contrast and is compact in size and configuration. A disadvantage is that as in the previous design, polarization splitting of the "S" and "P" polarization states by the dichroic filters and polarizers reduces the color passband ranges and consequently causes low throughput and loss of brightness.

In spite of the foregoing efforts, little progress has been made in solving the problem of providing high contrast and brightness in a projector that can be run from a 110 volt power source.

SUMMARY OF THE INVENTION

The principal object of the invention is to provide a high efficiency liquid crystal light valve projector system with simultaneously improved brightness and contrast without reducing efficiency.

This object as well as other objects is achieved by a video projector design which utilizes low f/# optics in conjunction with absorptive prepolarizers to remove residual light of an unwanted polarization state allowed into the system by the low f/# optics. This allows high brightness with high efficiency and without sacrificing contrast. In addition, the present invention provides for color-specific polarization channels such that light in the first and third color channel is of a first polarization state and light in the second color channel is of a second polarization state so that the projected image contains corresponding color and polarization states. Color wavelength passband endpoints of the second color have intersecting overlaps with color passbands of the first and third colors to enhance screen image brightness.

BRIEF DESCRIPTION OF THE DRAWINGS

The present invention will be described in more detail in connection with the Drawing, wherein.

DETAILED DESCRIPTION OF THE INVENTION

Generally, brightness efficiency in a video projector is a function of the numerical aperture of the illumination and projection optics and the extent of the visible light spectrum that can be used by the optical system. The intensity of the light falling on the viewing screen is related to the f-number (f/#) of an optical system as follows:

$$I \propto (NA)^2 \quad (1)$$

where $I = $ intensity;

and $NA = $ numerical aperture and $$f\# = \frac{1}{2NA} \quad (2)$$

and $$NA = \sin\theta \quad (3)$$

Where $\theta$ is the half angle of a cone of light emanating from a point source and containing all of the light passing though the optics. Thus, light intensity varies inversely with the square of the f/# of the optical system. So, all else being equal, a lower f/# means more brightness. And the relationship is non-linear. For example, a projector with f/4.5 optics will have approximately 4 times the brightness of a projector with f/9.5 optics. This being the case, a logical question is what is preventing the use of low f/# optics in video projectors. And the answer lies in the competing requirements for high contrast ratio and power efficiency.

Generally, contrast ratio in a polarization based video projector is a measure of the effectiveness of a polarizing prism to analyze light containing both S- and P-polarization states.

The usable optical passband and the system optical aperture (f/#) are dictated primarily by the wavelength and angle sensitivity of the polarizing prism to angle of incidence (i.e. $\theta$). This phenomenon is illustrated in conjunction with FIG. 1.

Figure 1A:
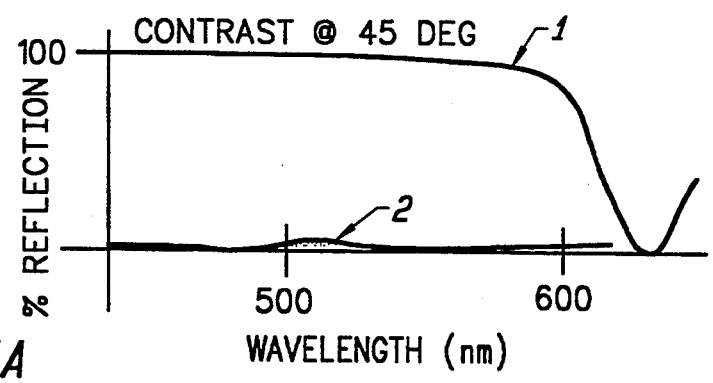
FIG. 1(a) shows the pass band for P and S-polarized light in a typical polarizing cube where all incident light strikes the prism at an angle of 45°.

FIG. 1(a) is a graph of the transfer function of a typical high quality polarizing prism used in a light valve projector where all of the incident light hits the refracting surface of the prism at exactly 45°. That is, the rays of all entering light are parallel (collimated) and orthogonal to the prism. The transfer function graphically illustrates the efficiency of the prism. Referring to FIG. 1(a), curve 1 shows the percent of $R_s$ that is reflected by the prism. Curve 2 shows the percent of $R_p$ that is reflected by the prism. As can be seen from FIG. 1(a); the prism reflects nearly 100 percent of $R_s$ over the meaningful optical spectrum until about 580 nanometers. The prism effectively blocks all $R_p$ except for a tiny amount around 510 nanometers.

Figure 1B:
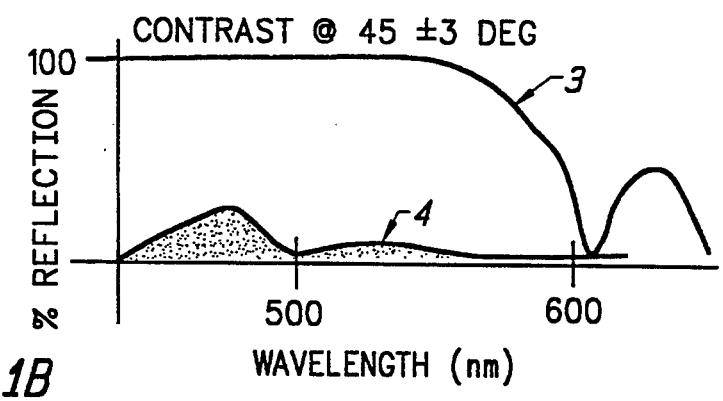
FIG. 1(b) shows the pass band for P and S-polarized light in a typical polarizing cube where incident light strikes the prism at angles of 45°±3°.

FIG. 1(b) is a graph of the transfer function of a typical high quality polarizing prism used in a light valve projector where all of the incident light hits the reflecting surface at an angle of 45°±3°. That is, the rays of all entering light are within a cone having a half angle of 3° to a center ray that is at 45° to the prism's refracting surface. The transfer function graphically illustrates the efficiency of the prism. Referring to FIG. 1(b), curve 3 shows the percent of $R_s$ that is reflected by the prism. Curve 4 shows the percent of $R_p$ that is reflected by the prism. As can be seen from FIG. 1(b), the prism reflects nearly 100 percent of $R_s$ over the meaningful optical spectrum until about 550 nanometers. The prism is much less effective at blocking $R_p$. Indeed around 450 nanometers, the percent reflection of $R_p$ reaches about 25%. Thus, the passband is narrower and the polarizing efficiency is diminished relative to a system in which all incident light is collimated. A $\theta = 3°$ corresponds to f/9.5.

Figure 1C:
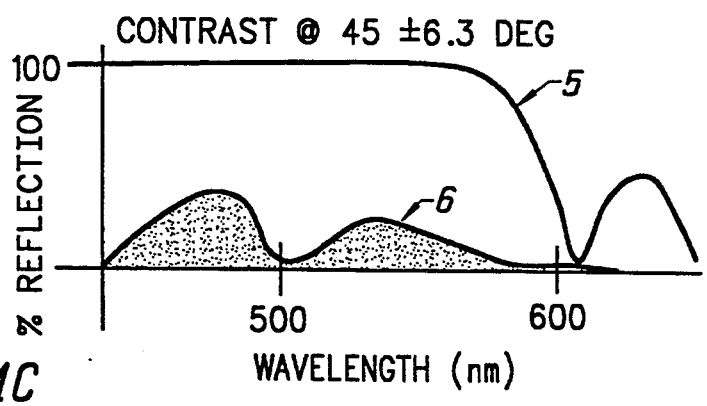
FIG. 1(c) shows the pass band for P and S-polarized light in a typical polarizing cube where incident light strikes the prism at angles of 45°±6.3°.

FIG. 1(c) is a graph of the transfer function of a typical high quality polarizing prism used in a light valve projector where all of the incident light hits the reflecting surface at an angle of 45°±6.3°. That is f/4.5 optics are used. The transfer function graphically illustrates the efficiency of the prism. Referring to FIG. 1(c), curve 5 shows the percent of $R_s$ that is reflected by the prism. Curve 6 shows the percent of $R_p$ that is reflected by the prism. As can be seen from FIG. 1(c), the prism reflects nearly 100 percent of $R_s$ over the meaningful optical spectrum until about 550 nanometers. The prism is even less effective at blocking Rp than was the case with a 3 degree half angle. Indeed around 450 nanometers, the percent reflection of $R_p$ reaches about 40% and around 525 nanometers it is about 25%. Thus while the passband is about the same as that for a 3 degree half angle system, the polarizing efficiency is diminished even more than in a 3 degree half angle system.

FIGS. 1(a), (b) and (c) taken together show that as the half angle of the optical system increases, the ability of a high quality polarizing prism to analyze polarized light decreases.

As shown in FIG. 1(a), (b) and (c), the transmission and reflection of S- and P-polarization is largely determined by the angle of incidence and the wavelength passband. The incidence angle of 45° is high contrast for all wavelengths in the passband, with ±3° (f/9.5) delivering lower contrast and ±6.3° (f/4.5) delivering still lower contrast. Therefore, light valve projection systems utilizing polarizing prisms only to achieve high contrast will be limited to color pass bands that are narrower than the width of the wavelength passband available for each of the three colors, and illumination and projection optics with high f/#. Hence, the amount of light (brightness) in the passband will be limited. All prior art in this field describes the use of polarizing prisms exclusively to achieve high contrast.

This invention interposes absorptive film prepolarizers in such a manner as to attenuate reflected P-polarization. Since the polarizing prisms have maximum polarizing efficiency at a unique angle of the incident light and also have maximum polarizing efficiency at a single color wavelength, any expansion of the color passband to include multiple wavelengths or any increase in the range of incident angles will degrade the effectiveness of the polarizing prism to polarize and analyze light containing both S- and P-polarization. This shows up in the image as a loss of contrast. However, the absorptive sheet polarizer is less sensitive to a broad spread of passband wavelengths and angles of incidence. This allows the use of high cone angles of incident light and wide color passbands to pass more light through the optical train and hence increase screen brightness without loss of contrast.

Figure 1D:
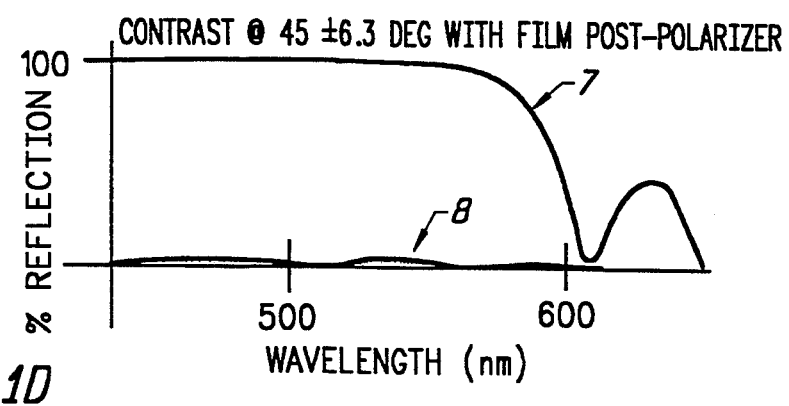
FIG. 1(d) shows the pass band for P and S-polarized light in a typical polarizing cube where incident light strikes the prism at angles of 45°±6.3°, but where film polarizers are added to the optical system.

FIG. 1(d) is a graph of the transfer function of the same polarizing prism used in FIGS. 1(a)-1(c) receiving light with a cone half angle is 6.3°. Referring to FIG. 1(d), curve 7 shows the percent of $R_s$ that is reflected by the prism. Curve 8 shows the percent of $R_p$ that is reflected by the prism. As can be seen, $R_p$ has been nearly eliminated by the addition of an absorptive film polarizer.

Figure 2:
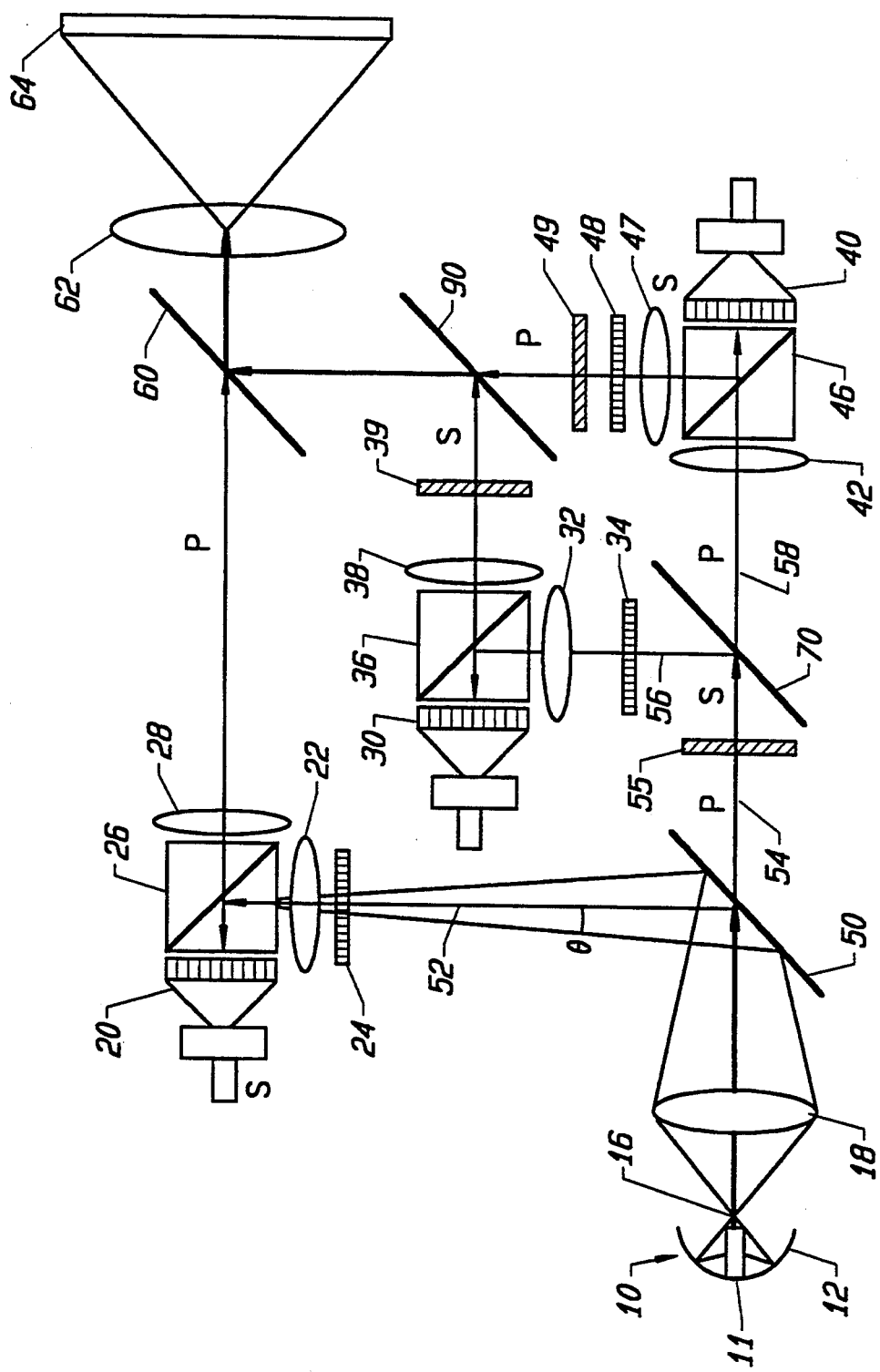
FIG. 2 is an optical schematic of a preferred embodiment of the invention.

FIG. 2 illustrates a preferred embodiment of that aspect of the present invention that utilizes sheet polarizers in cooperation with polarizing prisms to lower the f/# of the optics without sacrificing contrast. Referring now to FIG. 2, lamp 10 is a high-intensity Xenon or metal-halide lamp. An Osram HTI 400 is typical of the metal-halide type and an Osram XBO 1000 is typical of the Xenon type. Reflector 12 is elliptical and focuses the image of arc 14 of lamp 10 at point 16. Condensing lens 18 focusses the image of arc 14 at the plane of liquid crystal light valves 20, 30 and 40. The focal distance from lens 18 to the plane of light valve 20, 30 and 40 is equidistant. The cone half-angle of light $\theta$ as measured from the axis of the principal ray is approximately 6.3°, corresponding to f/4.5. Field lens 22, 32, and 42 cause the light passing through polarizing prisms 26, 36 and 46 to be telocentric so that all light incident at all points on the plane of light valves 20, 30 and 40 will have a $\theta = 6.3°$. Field lenses 28, 38 and 47 are part of projection lens 62.

White light from lamp 10 is separated by dichroic filter 50 into light of a first color channel 52 containing the blue band of the visible spectrum and a second color channel 54 containing the red and green bands of the visible spectrum. At this point, the light in both channels 52 and 54 contain both S- and P-polarization states. No optical energy has been thrown away.

Light 52 is transmitted through polymer film polarizer 24 where P-polarized light is absorbed and S-polarized light is transmitted. The S-polarized light emerging from sheet polarizer 24 is transmitted through field lens 22 to polarizing prism 26 where any residual P-polarized light is passed through the prism and out of the optical system. S-polarized light is reflected by prism 26 to light valve 20 where it is phase modulated between the S- and P-polarization states in accordance with the image presented to the input of the light valve.

The light valves utilized in this invention are multi-layered, planar structures consisting of a liquid crystal layer, a reflective dielectric mirror, a light-blocking layer, and a photoconductive layer all disposed between transparent, conductive layers on glass substrates. When a spatially variable, amplitude modulated pattern of light from an addressing source such as a CRT is focused on the photoconductive layer, it is transformed into a nearly identical pattern in the liquid crystal layer. The liquid crystal modulates the polarization state of a high-intensity projection light to form a replica of the addressing light pattern. This light-valve is described by Boswell in U.S. Pat. No. 4,019,807.

The modulated light from light valve 20 is analyzed by polarizing prism 26. That is, S-polarized light is reflected back to illumination source 10, and the P-polarized light is transmitted through. The P-polarized light is passed by field lens 28 through dichroic combining filter 60 and focussed by projection lens 62 onto viewing surface 64 to form a light and dark pattern of blue light.

Light in the second color channel 54 is transmitted through half wave retarding waveplate 55 where the polarization state of the light polarized S is converted to P-polarization and the light polarized P is converted to S. Waveplate 55 is a half wave retarder for the red and green wavelength light and is of a type manufactured by Meadowlark Industries.

The light from wave plate 55 is separated by dichroic filter 70 to reflect green light 56 and transmit red light 58. Light 56 is transmitted through polymer film polarizer 34 where P-polarized light is absorbed and S-polarized light is transmitted. The S-polarized light is transmitted through field lens 32 to polarizing prism 36 where the residual P-polarized light is passed through the prism and out of the optical system. S-polarized light is reflected to light valve 30 where it is phase modulated between the S- and P-states in accordance with the image presented to the input of the light valve phase modulated between the S- and P-polarization states. The image pattern is analyzed by polarizing prism 36 by reflecting S-polarized light back into illumination source 10 and passing P-polarized light through. The P-polarized light from prism 36 is transmitted through field lens 38 to waveplate 39 where the state of the light polarized P is changed to S. The resulting green light is then first reflected from dichroic filter 90 and then reflected from dichroic filter 60, and then passed through projection lens 62 onto viewing screen 64. The result is a pattern of varying intensity of the primary color green.

Red light 58 is transmitted through field lens 42 to polarizing prism 46 where the P-polarized component is transmitted through to light valve 40 and S-polarized light is reflected out of the optical system. Light valve 40 phase modulates the incoming P-polarized light between the S- and P-polarized states. The image pattern is analyzed by polarizing prism 46 by passing P-polarized light back to illumination source 10 and reflecting S-polarized light further down the red optical channel.

The modulated S-polarized red light from polarizing prism 46 is transmitted through field lens 47 to polymer film polarizer 48 where any residual P-polarized light is absorbed. From film polarizer 48, the red light is passed through $\frac{1}{2}$ wave retarder 49 where the S-polarized light is converted to P-polarized light.

Modulated red, P-polarized light is combined with modulated green, S-polarized light at dichroic filter 90. The combined red and green polarized light is combined with the modulated blue, P-polarized light at dichroic filter 60 and focussed onto viewing screen 64 by projection lens 62. The result is a full color video image.

According to a second aspect of the invention, each of the primary colors is composed entirely of light of a single polarization state with the green band being opposite to red and blue and the cutoff frequencies of each band chosen to provide overlap of blue and green and of red and green.

Figure 3:
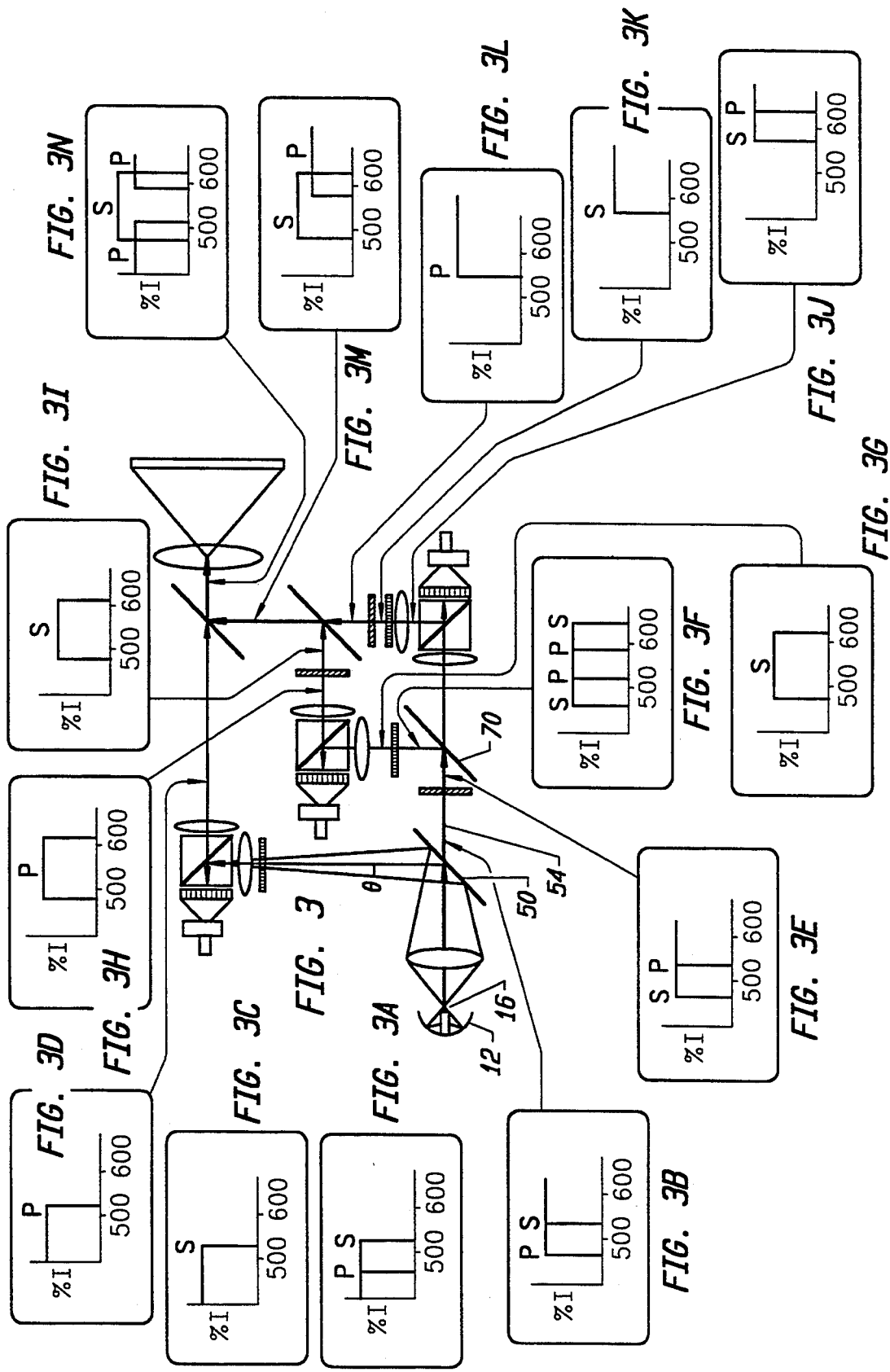
FIG. 3 is the optical schematic of a preferred embodiment with a series of graphs showing the idealized light intensity as a function of wavelength for S- and P-polarization components sampled at the indicated points in the optical light path.

FIG. 3 and the associated curves 3(a) through 3(n) are useful in explaining that aspect of the invention that optimizes brightness by allowing the overlap of the high end of the blue bandwidth with the low end of the green and the high end of the green with the low end of the red band. Each of the graphs is a plot of light intensity as a function of wavelength in nanometers. The cutoff points of the curves are idealized to simplify explanation. In reality, each of the curves is continuous. The reference numerals of FIG. 2 and 3 refer to the same elements.

Referring now to FIG. 3, high intensity light from lamp 10 is separated by dichroic filter 50 into light of first and second color channels 52 and 54. Color channel 52 contains the blue wavelengths as shown in FIG. 3(a). As can be seen, the pass band extends from the shortest wavelengths up to approximately 480 nanometers for P-polarized light and up to approximately 520 nanometers for S- polarized light. The difference in the pass band for the S- and P-polarized light is a fundamental characteristic of the way optical elements work on light containing both S- and P-polarization states. In general, S-polarized light has a broader reflected pass band than P-polarized light.

The spectrum of light 54 is illustrated by FIG. 3(b). As can be seen from FIG. 3(b) the red and green light in the P-polarization state commences at a frequency of approximately 480 nanometers and in the S-polarization state at a frequency of approximately 520 nanometers.

Light 52 is transmitted through polymer film polarizer 24 where the P-polarized light is absorbed and the S-polarized light is transmitted as shown in FIG. 3(c). The light leaving film polarizer 24 passes through field lens 22 to polarizing prism 26 where any residual P-polarization is rejected. S-polarized light reflected to light valve 20 is modulated as previously described.

The spectrum and polarization of light leaving polarizing prism 26 is shown in FIG. 3(d). From polarizing prism 26 the optical path for blue passes through field lens 28 to dichroic filter 60. The spectral characteristics of dichroic filter 60 are such that it passes wavelengths below approximately 550 nanometers. Thus, all of the spectral energy from light valve 20 is passed through dichroic filter 60 where it is focused by projection lens 62 to form a bright and dark pattern of blue on viewing screen 64.

Light in the second color channel 54 as shown in FIG. 3(b) contains all wavelengths from 480 nanometers up, that is red and green. The cutoff wavelength is 480 nanometers for P-polarization and 520 for S-polarization. Waveplate 55 is positioned in color channel 54 and causes the polarization state of the light polarized S to be converted to the P-polarization and the light polarized P to be converted to the S-polarization. This conversion is shown in FIG. 3(e).

Dichroic filter 70 has a spectral characteristic that causes it to reflect S-polarized light below approximately 620 nanometers and to reflect P-polarized light below approximately 580 nanometers. Thus the green spectrum is reflected from dichroic filter 70 as shown in FIG. 3(f). Dichroic filter 70 passes wavelengths of light in the S-polarization state from about 620 nanometers and higher and those in the P-polarization state from approximately 580 nanometers and higher.

Light from waveplate 55 is separated by dichroic filter 70 into green light 56 and red light 58. Light 56 is transmitted through polymer film polarizer 34 where P-polarized light is absorbed and S-polarized light is transmitted as shown by FIG. 3(g). The S-polarized light is transmitted through field lens 32 and polarizing prism 36 where the residual P-polarized light is rejected. S-polarized light is transmitted to light valve 30 where it is modulated as previously described. The spectrum and polarization characteristics of the light emerging from polarizing prism 36 is shown in FIG. 3(h). From polarizing prism 36 the optical path for green passes through field lens 38 to waveplate 39 where the polarization state of the light is changed from P to S as shown in FIG. 3(i).

Red light 58 is transmitted through field lens 42 to polarizing prism 46 where the P-polarized component is transmitted through to light valve 40 where it is in turn modulated as previously described. The spectrums and polarization of light leaving prism 46 is shown by FIG. 3(j).

S-polarized red light emerging from polarizing prism 46 is transmitted through field lens 47 to polymer film polarizer 48 where the residual reflected P is absorbed as shown in FIG. 3(k). Light emerging from film polarizer 48 is transmitted to halfwave retarder 49 where the S-polarized light is converted to P-polarized light as shown in FIG. 3(l).

Dichroic filter 90 has the spectral property of reflecting all S-polarized light below 620 nanometers and transmitting all P-polarized light above 580 nanometers. Accordingly, all light in the green channel is reflected and light in the red channel is transmitted by dichroic filter 90. This dichroic filter effectively combines the images from the green and red channels as shown by FIG. 3(m).

The red and green channels are combined with the blue channel by dichroic filter 60 which yields a spectrum and polarization state as shown in FIG. 3(n). As can be seen, the red and blue channels on either end of the spectrum are polarized P and the green channel is polarized S. Also, there is a substantial overlap in the blue-green and red-green.

Figure 4:
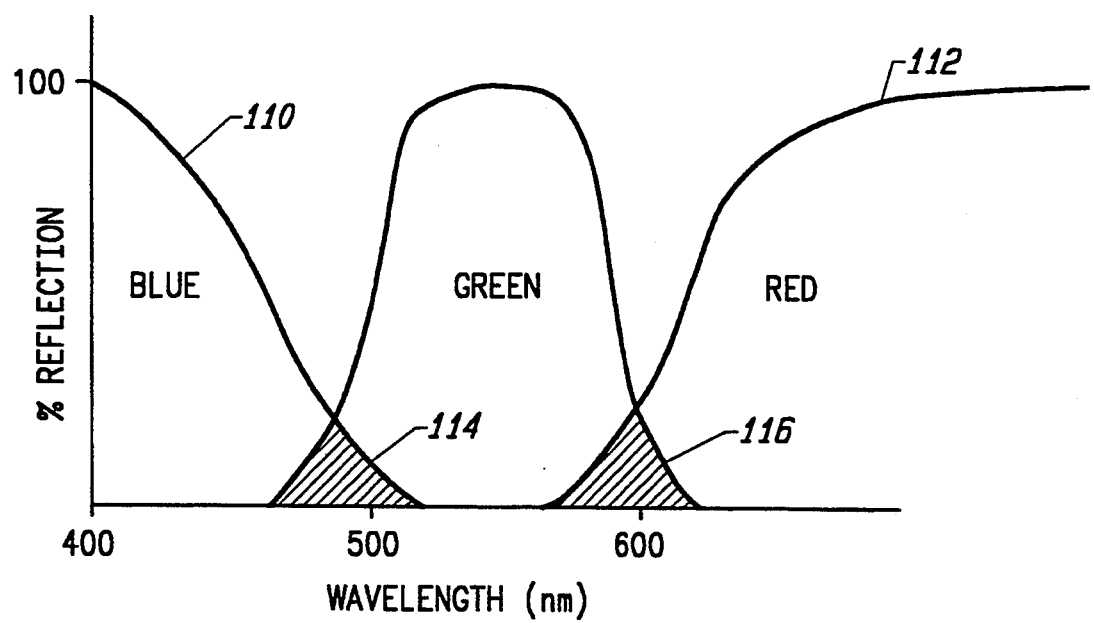
FIG. 4 shows the optical spectrum of the output light of the projector according to the present invention.

As mentioned previously, the waveforms as shown in the various figures of 3 are idealized. In reality there is a gradual falloff in intensity as the cutoff frequencies are reached. A spectrum more accurately reflecting the actual overlap is shown in FIG. 4. Referring now to FIG. 4, the tail of the blue spectrum 110 overlaps into the green. And the tail of the red 112 overlaps into the green at the other end of the frequency spectrum. This overlapping is made possible by insuring that all light in the red and blue channels are of a different polarity than the green channel. Those skilled in the art will recognize that it would have been equally practical to have the red and blue channels be S-polarized and the green channel be P-polarized. The effect of this approach is to increase the intensity of the output light by the amount of the spectrum overlap as shown by the hatched areas 114 and 116. In applications where the maximization of light output is critical this is a considerable advantage. Rather than the 50% loss of efficiency associated with typical prior art projectors using prepolarizing prisms, this invention allows white light efficiencies in excess of 50% due to the additive effect of the overlap of polarization specific passbands.

What is claimed is:

1. A video projector for producing a full color video image from three separate color channels each of said channels including a polarization modulating light valve, said projector comprising:
   a source of white light;
   a first optical color channel carrying light of a first color passband and being of a first polarization state, said first color passband encompassing the relatively long wavelengths in said color image;
   a second optical color channel carrying light of a second color passband and being of said first polarization state, said second color passband encompassing the relatively short wavelengths in said color image;
   a third optical color channel carrying light of a third color passband and being of a second polarization state, said third color passband overlapping at least one of said first or second passbands;
   combining means for combining the images from said first, second and third color channels into a composite image; and
   projection means for projecting said composite image onto an image plane.

2. The video projector of claim 1 wherein said third color passband overlaps both said first and said second color passbands.

3. The video projector of claim 1 wherein said light valve is a liquid crystal light valve.

4. The video projector of claim 3 wherein said light valve is a reflective liquid crystal light valve.

5. The video projector of claim 1 wherein at least one color channel has an absorbing sheet polarizer therein.

6. The video projector of claim 1 wherein the f/# of said projector is no greater than 5.

7. A video projector for producing a full color video image from separate red, green and blue color channels, comprising:
   a source of white light;
   a first dichroic filter positioned to receive said white light and adapted to isolate and direct light of a first color into a first primary color channel and the remaining light into a channel containing the remainder of said color spectrum;
   a second dichroic filter positioned to receive light from said first dichroic filter, and adapted to isolate a second primary color and direct it into a second primary color channel and the remaining light into a third primary color channel;
   first, second and third absorptive sheet polarizers, one positioned in each of said primary color channels and adapted to absorb light in a preferred polarization state and to pass all other light;
   first, second and third polarizing prisms, one positioned in each of said primary color channels;
   first, second and third polarization modulating light valves, one positioned in each of said primary color channels;
   combining means for combining the images from said first, second and third color channels into a composite image; and
   projection means for projecting said composite image onto an image plane.

8. The video projector of claim 7, wherein the f/# of the optics thereof is no greater than 5.

9. The video projector of claim 7, wherein said light valves are liquid crystal light valves addressed by cathode ray tubes.

10. The video projector of claim 7 further characterized by the addition of polarization shifting means for rotating the polarization of light impinging thereon by 90° to one or more of said primary color channels whereby the polarization state of said green channel is different than the polarization state of said red and blue channel.

11. A video projector comprising:
    a source of projection light containing substantially the entire visible spectrum;

a reflector of substantially elliptical shape positioned to capture a portion of the light from said projection light source and to reflect said light at a focal point;

a condensing lens positioned beyond the focal point of said reflector and intercepting substantially all of the reflected light from said reflector, said condensing lens adapted to form a first light beam;

a first dichroic beam splitter positioned in the optical path of said first light beam and adapted to divide said first light beam into a second light beam containing a single primary color and a third light beam containing the remaining primary colors;

a first sheet polarizer positioned in the optical path of said second light beam and adapted to transmit a substantial portion of said second beam with an S-polarization state and absorb a substantial portion of light in said second light beam with a P-polarization state;

a first polarization modulator positioned to receive said second light beam and adapted to modulate the polarity thereof with signal information;

a first polarizer-analyzer positioned in the optical path of said second light beam between said first sheet polarizer and said first polarization modulator and adapted to relay light in an S-polarization state only onto said first polarization modulator and to analyze said light beam reflected from said first polarization modulator such that said second light beam reflected from said first polarizer analyzer is amplitude modulated;

a first wave plate positioned in the optical path of said third light beam subsequent to said first dichroic beam splitter, said first wave plate adapted to cause the energy in said P-polarization state to become S-polarized and the energy in said S-polarization state to become P-polarized;

a second dichroic beam splitter positioned to receive said third light beam from said first wave plate and adapted to divide said third light beam into a fourth light beam containing only one of said remaining primary colors and a fifth light beam containing the final primary color;

a second polarization modulator positioned to receive said fourth light beam and adapted to modulate the polarity thereof with signal information;

a second polarizer-analyzer positioned in the optical path of said fourth light beam between said second dichroic filter and said second polarization modulator and adapted to relay light in a P-polarization state only onto said second polarization modulator and to analyze said fourth reflected light beam reflected from said second polarization modulator such that said fourth light beam reflected from said first polarizer analyzer is amplitude modulated;

a second sheet polarizer positioned in the optical path of said fourth light beam subsequent to said second polarizer-analyzer and adapted to transmit a substantial portion of said second beam with an S-polarization state and absorb a substantial portion of light in said second light beam with a P polarization state;

a second wave plate positioned in the optical path of said fourth light beam subsequent to said second polarizer-analyzer, said second wave plate adapted to cause the energy in said S-polarization state to become P-polarized;

a third sheet polarizer positioned in the optical path of said fifth light beam subsequent to said second dichroic filter and adapted to transmit a substantial portion of said fifth beam with an S- polarization state and absorb a substantial portion of light in said fifth light beam with a P-polarization state;

a third polarization modulator positioned to receive said fifth light beam and adapted to modulate the polarity of said beam with signal information;

a third polarizer-analyzer positioned in the optical path of said fifth light beam between third sheet polarizer and said third polarization modulator and adapted to relay light in an S-polarization state only onto said third polarization modulator and to analyze said fifth reflected light beam reflected from said third polarization modulator such that said fifth light beam reflected from said third polarization modulator is amplitude modulated;

a third wave plate positioned in the optical path of said fifth light beam subsequent to said third polarizer-analyzer, said third wave plate adapted to cause the energy in said P-polarization state to become S-polarized;

a first beam combiner positioned in the optical paths of said fourth and fifth light beams and adapted to combine said fourth and fifth light beams into a sixth light beam that contains all of the information of said fourth and fifth light beams;

a second beam combiner positioned in the optical path of said second and sixth light beams and adapted to combine said second and sixth light beams into an seventh light beam contain all of the information in said second and sixth light beams; and a projection lens positioned in the optical path of said seventh light beam and adapted to focus said beam onto a projection plane.

* * * * *